United States Patent [19]

Shibata

[11] 3,889,127
[45] June 10, 1975

[54] ELECTRIC CONTROL SYSTEM FOR DRIVING AN ELECTRIC VEHICLE INCLUDING FIRST AND SECOND CONVERTERS

[75] Inventor: Fukuo Shibata, Hyogo, Japan

[73] Assignee: Kawasaki Jukogyo Kabushiki Kaisha, Hyogo, Japan

[22] Filed: Mar. 22, 1974

[21] Appl. No.: 453,892

Related U.S. Application Data

[63] Continuation of Ser. No. 264,087, June 19, 1972, abandoned.

[30] Foreign Application Priority Data

June 19, 1971  Japan............................. 46-4426
June 26, 1971  Japan............................. 46-46499
July 2, 1971   Japan............................. 46-48640

[52] U.S. Cl. .................. 290/14; 290/50; 318/139; 180/65
[51] Int. Cl. ............................................. H02p 5/28
[58] Field of Search ............ 290/14, 17, 50; 318/49, 318/139, 197; 307/47; 321/31, 28; 180/65

[56] References Cited

UNITED STATES PATENTS

| 3,488,567 | 1/1970 | Shibato ............................ 318/197 |
| 3,521,137 | 7/1970 | Sweden ............................ 318/197 |
| 3,665,502 | 5/1972 | Means .............................. 307/47 |
| 3,758,836 | 9/1973 | Shibata ............................ 318/197 |

*Primary Examiner*—G. R. Simmon
*Attorney, Agent, or Firm*—Sughrue, Rothwell, Mion, Zinn & MacPeak

[57] ABSTRACT

An electric motor for driving a wheel of a vehicle is arranged to be supplied with electric power from an electric source of an electric battery group in series with an alternating current generator driven by a prime mover. The output terminals of the alternating current generator are connected with two sets of converters one of which is connected in series with the series connection of the electric battery group and the electric motor and the other of which is connected in parallel with the electric battery group. The electric motor can thereby be controlled easily over a wide speed range.

7 Claims, 5 Drawing Figures

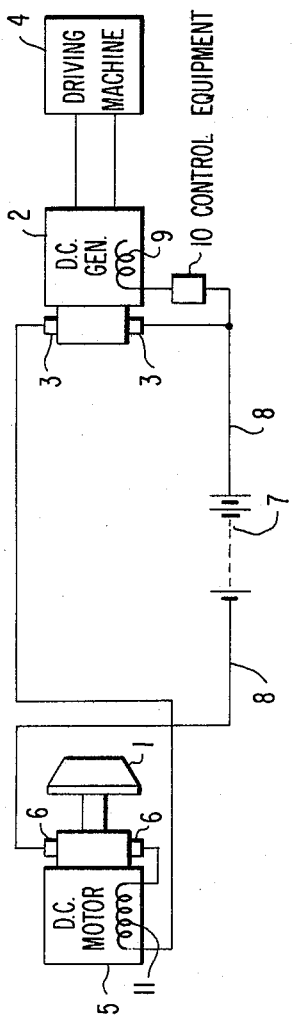
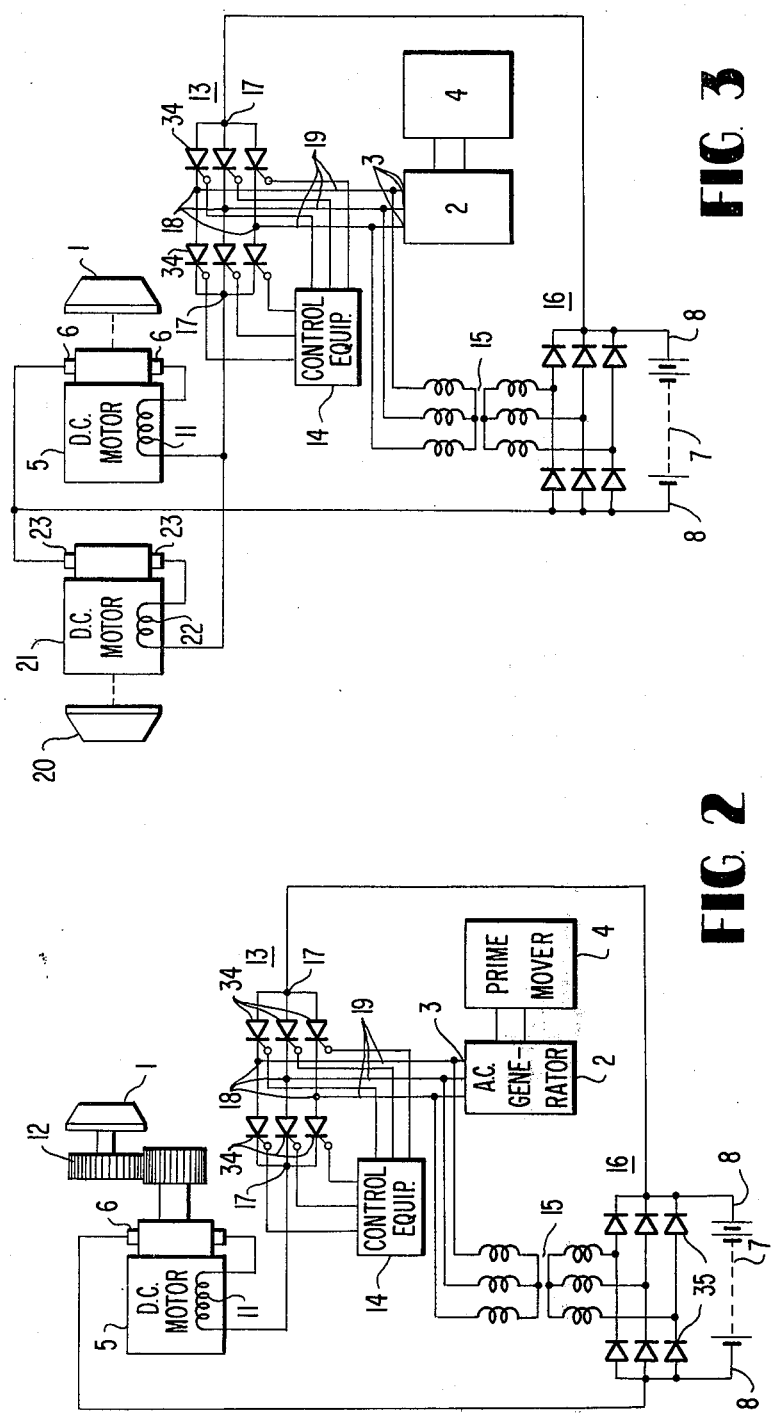
FIG. 1
FIG. 2
FIG. 3

ELECTRIC CONTROL SYSTEM FOR DRIVING AN ELECTRIC VEHICLE INCLUDING FIRST AND SECOND CONVERTERS

This is a continuation of application Ser. No. 264,087, filed June 19, 1972, and now abandoned.

BACKGROUND OF THE INVENTION

1. Field of the Invention

This invention is related to an electric control system for driving an electric vehicle whose wheel can be driven by an electric motor supplied simultaneously with electric power from an electric battery group and an electric generator driven by a prime mover.

2. Description of the Prior Art

In a prior arrangement of a hybrid electric vehicle, an electric motor for driving a wheel of the vehicle is supplied simultaneously with electric power from an electric battery and an electric generator driven by a prime mover. If the prime mover is a high speed one, it is preferable to use an alternating current generator as the electric generator. In such an ordinary prior arrangement for a hybrid electric vehicle, the electric motor driving the vehicle is electrically connected with the electric power sources which are composed of the electric battery connected electrically in parallel with the alternating current generator.

When it is desired to control the speed of the D.C. electric motor over a wide range in such prior arrangement of a hybrid electric vehicle, a complicated device such as a thyristor chopper should be connected electrically between the input terminals of the electric motor and the output terminals of the electric battery. The thyristor chopper is very complicated, considerably expensive, and unreliable in operation.

When it is desired to control the speed of an A.C. electric cage rotor motor over a wide range in such prior arrangement of a hybrid electric vehicle, a complicated device such as a self-commutated inverter is connected electrically between the motor and the electric battery. In such a case, the self-commutated inverter using semiconductor controlled recitifiers becomes very complicated, unreliable in operation and expensive, as there are various difficult problems in connection with commutations.

In a prior arrangement of a hybrid electric vehicle in which an alternating current generator driven by a prime mover and an induction motor of the wound rotor type are used, the wound rotor type induction motor is supplied with electric power from the electric power sources which are composed of the electric generator connected electrically in parallel with an electric battery through an inverter of controlled rectifier type. In this case, the wound rotor type induction motor cannot be controlled continuously in the high speed range, although it can be controlled continuously in the low speed range.

SUMMARY OF THE INVENTION

It is the primary object of the invention to provide an electric control system for driving an electric vehicle in which an electric motor for driving the wheel is supplied simultaneously with electric power from an electric battery and an alternating current generator driven by a prime mover and in which the electric motor can be controlled easily over a wide speed range, with high reliability and without sacrificing efficiency of operation or economy of apparatus of this system.

Another object of this invention is to provide an electric control system for driving an electric vehicle in which an electric motor for driving the wheel is supplied simultaneously with electric power from an electric battery group and an alternating current generator driven by a prime mover and in which it is possible to reduce considerably the space of installation of an electric control system for driving the vehicle.

BRIEF DESCRIPTION OF THE DRAWINGS

FIG. 1 is a simplified block diagram of a system illustrating the principles of the present invention.

FIGS. 2–4 are schematic diagrams of the preferred embodiments of the present invention.

DESCRIPTION OF THE PREFERRED EMBODIMENTS

Figure 5:
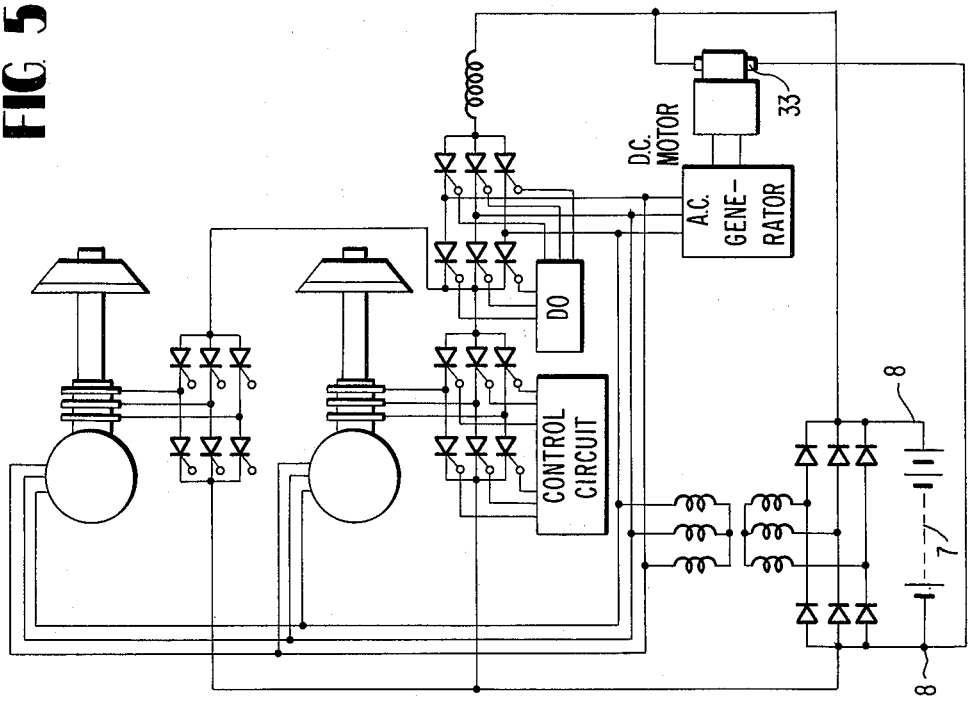

As shown in FIG. 1, an electric control system for driving an electric vehicle includes a wheel 1 by which the vehicle can be driven forward. An electric generator 2, which has output terminals 3, is coupled to a driving machine 4 which is arranged to drive the electric generator. An electric motor 5, which has input terminals 6, is arranged to drive the wheel 1 of the vehicle. An electric battery 7 has output terminals 8 connected electrically with the input terminals 6 of the electric motor 5 and with the output terminals 3 of the electric generator 2. The output terminals 3 of the electric generator 2 are connected electrically with the series connection of the terminals 6 of the electric motor 5 and the electric battery 7. The voltage of the electric battery 7 plus the voltage of the circuit connected electrically with the terminals 3 of the electric generator 2 may be imposed upon the terminals 6 of the electric motor, thus the electric motor 5 may be supplied with electric power from the electric battery 7 and the electric generator 2.

Figure 4:
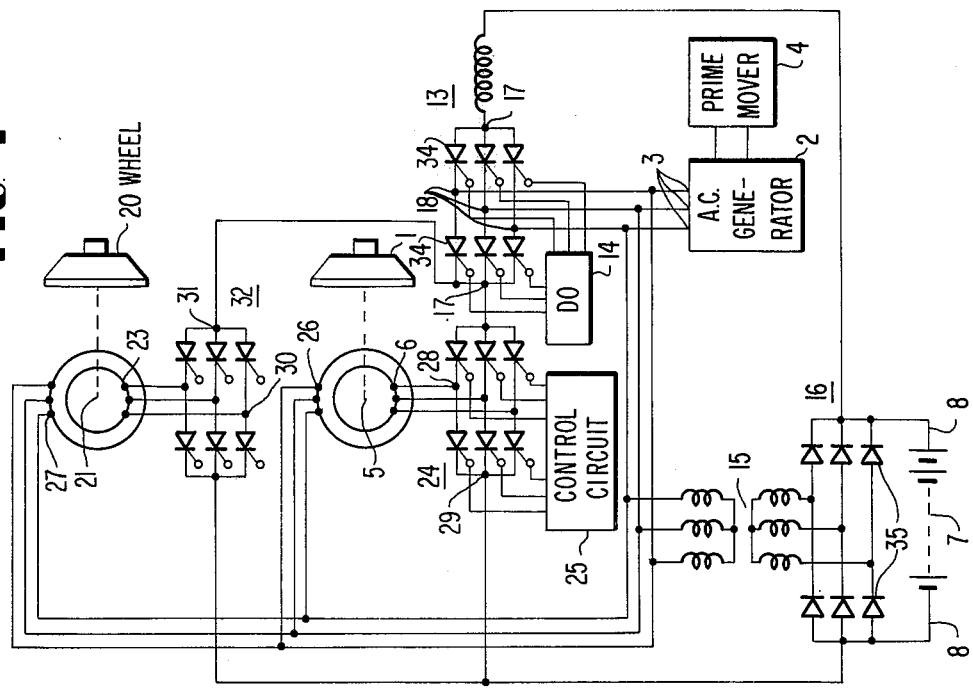

In FIG. 1, the electric generator 2 is illustratively shown as a direct current generator having a separately excited field winding 9, which is supplied with exciting current from an electric power source such as the electric battery 7 through control equipment 10. The electric motor 5 is a direct current motor having a series field winding 11. Examples of driving machines 4 are prime movers such as a gasoline engine, a diesel engine, a gas turbine, a Stirling engine, steam engine, etc. These examples of driving machines 4 are shown in FIG. 2, FIG. 3, and FIG. 4.

When the direct current motor 5 is started, the control equipment 10 is controlled so that the direct current generator 2 may be operated as a motor. For instance, if the terminal voltage of the electric battery 7 is +200 volts, and the terminal voltage of the direct current generator 2 is −150 volts, the voltage supplied to the terminals of the direct current motor 5 becomes 50 volts. After the direct current motor 5 is started, the control equipment 10 is controlled so that the terminal voltage of the direct current generator 2, operating as a motor, may be reduced gradually. When the terminal voltage of the direct current generator 2 becomes zero, the voltage supplied to the terminals of the direct current motor 5 becomes 200 volts equal to the terminal voltage of the electric battery 7. If the direction of the exciting current of the field winding 9 is changed, the direct current generator 2 operates as a generator. After the terminal voltage of the direct current generator 2 becomes zero, the control equipment 10 is controlled so that the terminal voltage of the direct current generator 2, operating as a generator, may be increased gradually. If the terminal voltage of the direct current generator 2 becomes +200 volts, the voltage supplied to the direct current motor 5 becomes 400 volts which is equal to the terminal voltage of the electric battery 7 plus the terminal voltage of the direct current generator 2. In this case, the direct current motor 5 rotates at maximum speed. Thus, the direct current motor 5 can be controlled easily over a wide speed range by controlling the terminal voltage of the electric generator 2 operating it as a motor or as a generator.

In FIG. 2, the electric generator 2 is an alternating current generator. A wheel 1 of the vehicle is driven by a direct current motor 5 through a gear 12. A converter 13 comprises controlled rectifiers 34 whose A.C. side terminals 18 are connected electrically with the output terminals 3 of the alternating current generator 2. The D.C. side terminals 17 are connected electrically with the series connection of the input terminals 6 of the electric motor 5 and the output terminals 8 of the electric battery 7. In this case, the electric motor 5 is a direct current motor. The output terminals 3 of the alternating current generator 2 are connected electrically with the output terminals 8 of the electric battery 7 through a transformer 15 and a converter 16 composed of rectifiers 35.

In FIG. 2, the terminal voltage of the alternating current generator 2 can be controlled over a range somewhat less than that described in the explanation in FIG. 1. The electric battery 7, however, can be charged with electric power from the alternating current generator 2 through the transformer 15 and the converter 16. The terminal voltage at the D.C. terminals 17 of the converter 13 is controlled by control equipment 14 connected to the gates of controlled rectifiers 34. The converter 13 can be controlled from a range operated as a converter to a range operated as an inverter. When the circuit 13 operates as a converter, the A.C. output power of the alternating current generator 2, which is operating as a generator, is fed to the converter 13 via electrical connections 19 and is converted into D.C. power by the converter 13. When the converter 13 operates as an inverter, the electric power converted into alternating current can be supplied either to the alternating current generator 2 or to the output terminals 8 of the electric battery 7 through the transformer 15 and the converter 16. Thus, the direct current motor 5 can be controlled easily over a wide speed range by controlling the control equipment 14 which controls the controlled rectifiers of the converter 13 from a range operated as a converter to a range operated as an inverter.

The controlled rectifiers 34 of converter 13 are controlled by the control equipment 14 which operates in a well-known manner to simply vary the turn on point of the controlled rectifiers 34. Such control equipment 14 by which a converter 13 connected thereto can be controlled over the range operating as a converter and as an inverter can be found in the arrangement 30 of my U.S. Pat. No. 3,488,567. As shown in that patent, the arrangement 30 is simply composed of a pulse transformer and an adjustable phase shifter supplied with electric energy from an alternating current source. To vary the turn on point of the controlled rectifiers, it is only necessary to control the adjustable phase shifter, and by so doing, the converter 13 can be controlled or operated as a converter converting A.C. power into D.C. power or as an inverter converting D.C. power into A.C. power. In other words, the converter 13 can be controlled continuously from the range operating as an inverter to the range operating as a converter by controlling the control equipment 14.

Upon starting the direct current motor 5, the control equipment 14 for the converter 13 is controlled so that the converter 13 can operate as an inverter. For instance, if the terminal voltage of the electric battery 7 is +200 volts, and the D.C. side terminal voltage of the converter 13 is −150 volts, the voltage supplied to the terminals of the direct current motor 5 becomes 50 volts. After the direct current motor 5 is started, the control equipment 14 is controlled so that the D.C. side terminal voltage of the converter 13 may be reduced gradually such as −150 volts, −130 volts, −100 volts, −70 volts, etc. When the D.C. terminal voltage of the converter operating as an inverter becomes zero, the voltage supplied to the terminals of the direct current motor 5 becomes 200 volts which is equal to the terminal voltage of the electric battery 7. After the D.C. side terminal voltage of the converter 13 becomes zero, the control equipment 14 is controlled so that the converter 13 may operate as a converter, and the D.C. side terminal voltage may be increased gradually. If the D.C. side terminal voltage of the converter 13 becomes +200 volts, the voltage supplied to the direct current motor becomes 400 volts which is equal to the terminal voltage of the electric battery 7 plus the D.C. side terminal voltage of the converter 13. In that case, the direct current motor 5 can be controlled easily over a wide speed range. In this arrangement, the converter 13 can be operated as a separately excited or A.C. commutated inverter. In general, a separately excited or A.C. commutated inverter is simple, economical and reliable in operation. Therefore, the whole arrangement can be simple, economical and reliable in operation.

In FIG. 2, the generator 2 may be an alternating current synchronous generator.

In FIG. 3, there is shown another direct current motor 21 which has a series field winding 22, which can drive another wheel 20 of the vehicle. Terminals 23 of motor 21 are also connected electrically with the series connection of the converter 13 composed of controlled rectifiers 34 and the output terminals 8 of the electric battery 7.

In FIG. 4, the electric motor 5 is an alternating current motor whose input terminals 6 are connected electrically in series with an inverter 24, the converter 13 described in FIG. 3 and the output terminals 8 of the electric battery 7. The driving machine 4 is a prime mover; the electric generator 2 is an alternating current synchronous generator. Converter 13 comprising controlled rectifiers 34 can be controlled as an inverter. A.C. terminals 18 are connected electrically with the output terminals 3 of the alternating current synchronous generator 2 and the D.C. terminals 17 are connected electrically with the series connection of the input terminals 6 of the electric motor 5 through the inverter 24 and the output terminals 8 of the electric battery. The output terminals 3 of the alternating current generator 2 are connected electrically with the output terminals 8 of the electric battery 7 through a transformer 15 and another converter 16 composed of rectifiers 35. The electric motor 5 driving the wheel 1 of the vehicle is a wound rotor type induction motor whose primary winding 26 is connected electrically with the output terminals 3 of the alternating current generator 2 and each phase of secondary winding is respectively connected electrically, through its input terminals 6, with the A.C. terminals 28 of the inverter 24. The D.C. terminals 29 of inverter 24 are connected electrically in series with the converter 13 comprising controlled rectifiers 34 and the output terminals 8 of the electric battery 7. Further in FIG. 4, there is provided another wound rotor induction motor 21 which can drive another wheel 20 of the vehicle. The primary winding 27 of motor 21 is also connected electrically with the output terminals 3 of the alternating current generator 2 and each phase of the secondary winding is respectively connected electrically, through its input terminals 23, with the A.C. terminals 30 of the inverter 32. The D.C. terminals 31 of inverter 32 are connected electrically in series with the converter 13 comprising controlled rectifiers 34 and the output terminals 8 of the electric battery 7.

The wound rotor induction motor 5 can be controlled by a well-known method. The motor 5 works in the region of slip $s > 1$, so that the rotor revolves against the rotating field. The inverter 24 works at a higher frequency than that of the A.C. power supplied to the primary winding 26. Part of the slip power is fed back to the A.C. network connected with the primary winding 26 of the motor 5. The inverter 24 can be controlled as a conventional A.C. commutated inverter by a control circuit 25. An example of a control circuit 25 for the controlled rectifiers of the inverter 24 can be found in FIG. 1 of my U.S. Pat. No. 3,531,701 and composed of a firing circuit 12 and phase shift control device 14. The turn on point of the controlled rectifiers of the inverter 24 is controlled by the control circuit 25, of which the operation is the same as that of control equipment 14 explained hereinabove but the control range is limited to the region in which the inverter 24 operates as an inverter.

When the prime mover is used as the driving machine 4, and an alternating current generator is used as the generator 2, the electric motor 5 can be supplied with electric power from either or both the electric battery 7 and/or the generator 2. At the starting of the electric motor 5, the electric motor 5 can be supplied with electric power principally from the electric battery 7, and at a comparatively low load of the electric motor 5, the electric motor 5 can be supplied with electric power principally from the alternating current generator 2. Thus, the capacity and weight of the electric battery in the electric vehicle can be reduced.

As can be understood from the explanation described hitherto, simple, economical and reliable electric control systems using simple motors, for instance D.C. motors or A.C. motors fed from simple converters or simple A.C. commutated inverters can be arranged for driving electric vehicles of this invention, the speeds of the motors being able to be controlled over wide speed ranges without sacrificing efficiencies of operations.

What is claimed is:

1. An electric control system for driving an electric vehicle having at least one wheel, said system comprising:
    a. alternating current electric generator means which has output terminals;
    b. prime mover means for driving said electric generator means;
    c. first electric motor means, having input terminals, for driving said wheel of the vehicle;
    d. an electric battery which has output terminals connected electrically with the input terminals of said first electric motor means and with the output terminals of said electric generator means;
    e. a first converter composed of controlled rectifiers and having A.C. side terminals connected electrically with the output terminals of said electric generator and D.C. side terminals connected electrically in series with the input terminal of said first electric motor and the output terminals of said electric battery;
    f. control means connected to vary the turn on point of said controlled rectifiers to operate said first converter as a converter converting A.C. power into D.C. power or as an inverter converting D.C. power into A.C. power thereby controlling the electric generator voltage connected in said circuit with said first electric motor means; and
    g. second converter having A.C. side terminals connected electrically with the output terminals of said electric generator and D.C. side terminals connected electrically with the output terminals of the said electric battery;

whereby said first electric motor means is variably supplied with electric power from said electric battery and said electric generator means permitting control of said first electric motor means over a wide speed range.

2. An electric control system as claimed in claim 1 wherein said first electric motor means is a direct current motor; and wherein the input terminals of said first electric motor, the output terminals of said electric battery means, and the D.C. terminals of said first converter are connected in series circuit.

3. An electric control system as claimed in claim 1 wherein said first electric motor means is an alternating current motor; said system further comprising a D.C. to A.C. inverter having A.C. terminals connected to the input terminals of said first electric motor means and having D.C. terminals connected in series circuit with the D.C. terminals of said first converter and the output terminals of said electric battery.

4. An electric control system as claimed in claim 1 further comprising a transformer means connected between the output terminals of said alternating current electric generator means and the A.C. terminals of said second converter.

5. An electric control system as claimed in claim 1 wherein said first electric motor means is a wound rotor type induction motor having primary and secondary windings; said system further comprising a D.C. to A.C. inverter having A.C. and D.C. terminals; said primary windings being connected to the output of said alternating current generator; said secondary windings being connected to the A.C. terminals of said inverter; and a series circuit connection between the D.C. terminals of said inverter, the D.C. terminals of said first converter and the output terminals of said electric battery means.

6. An electric control system as claimed in claim 5 wherein said vehicle has at least a second wheel and wherein said system further comprises a second wound rotor type induction motor for driving said second wheel, said second induction motor having primary and secondary windings; a second D.C. to A.C. inverter having D.C. and A.C. terminals; the primary windings of said second induction motor being connected to the output terminals of said alternating current generator; the secondary windings of said second induction motor being connected to the A.C. terminals of said second inverter; and the D.C. terminals of said second inverter being connected in parallel with the D.C. terminals of said first inverter.

7. An electric control system as claimed in claim 2 wherein said vehicle has at least a second wheel and wherein said system further comprises a second direct current motor for driving said second wheel, said second direct current motor having input terminals connected in parallel with the input terminals of said first direct current motor.

* * * * *